United States Patent Office 3,485,014
Patented Dec. 23, 1969

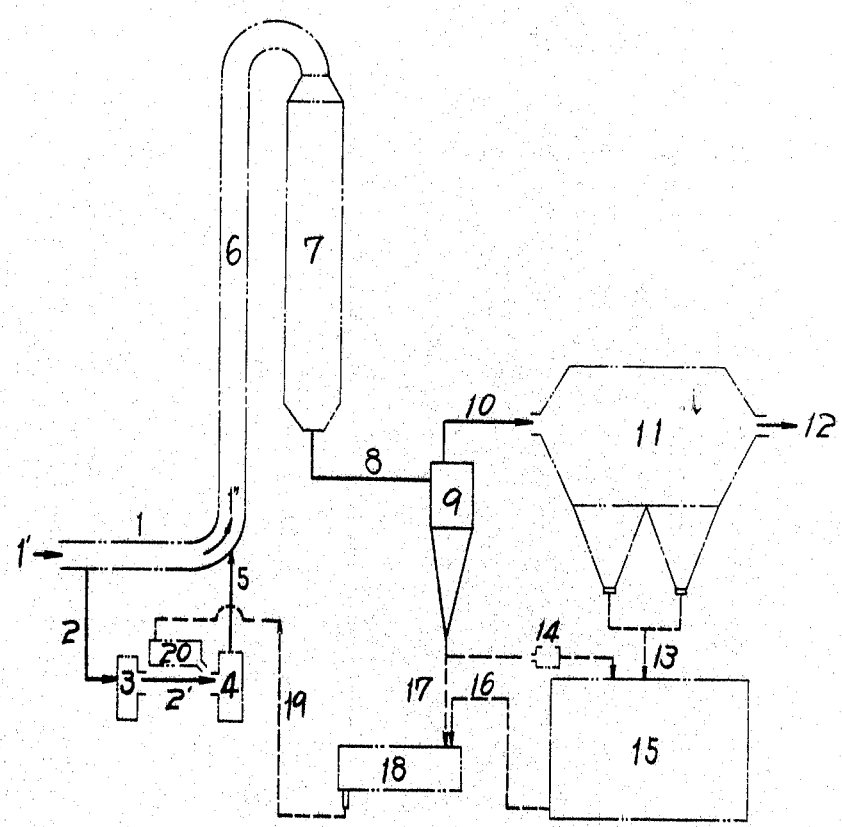

3,485,014
METHOD OF CONTACTING A GAS WITH A PARTICULATE SOLID
Masumi Atsukawa, Yoshihiko Nishimoto, and Kazuhiro Matsumoto, Hiroshima-shi, Japan, assignors to Mitsubishi Jukogyo Kabushiki Kaisha, Tokyo, Japan
Continuation of application Ser. No. 524,307, Feb. 1, 1966. This application July 2, 1968, Ser. No. 751,653
Claims priority, application Japan, Jan. 30, 1965, 40/5,007
Int. Cl. B01d 53/14, 53/16
U.S. Cl. 55—73                                  7 Claims

ABSTRACT OF THE DISCLOSURE

In contacting a contaminating gas flow with a particulate solid absorbant material, the gas flow is divided into two parts, the solid material is mixed into one of the parts and then the two parts are combined. After passage through a two-part contact zone, the solid material is separated in a two-step separation operation in which the coarse particles and then the fine particles are separated. Subsequently, all of the fine and some of the coarse particles are regenerated and then the solid material is recycled for contact with the gas.

---

This is a continuation of application Ser. No. 524,307 filed Feb. 1, 1966, now abandoned.

This invention generally relates to gas-solid contact procedures and is particularly directed to a novel method for establishing intimate contact between a particulate solid, such as powder, and a gas flow in which the particulate solid is distributed or dispersed.

The inventive method is suitable for any procedure wherein intimate contact is to be established between a particulate solid and a gas stream or flow as, for example, in the mixing of a gas flow and powder for carrying out a vapor phase reactive wherein the powder exerts a catalytic influence on the reaction or in conducting heat exchange between a powder and a gas stream. However, the invention is particularly applicable to, and for this reason will in the following be described in connection with, gas treating or purification procedures, wherein a contaminated gas flow is continuously brought into intimate contact with a particulate or powderous material for the purpose of removing the contaminants from the flow by absorption or adsorption.

With a view to reducing air pollution, waste or off-gases from factories and plants are generally subjected to gas purification procedures to remove undesired and injurious contaminates from such gases. Various processes have been suggested for this purpose, the purpose of which is the effective removal of the undesired contaminants at a minimum of cost.

The most common gas purification processes are wet processes, wherein the waste gas flow is washed with an aqueous solution or an aqueous slurry to remove the undesired contaminants such as, for example, sulfur oxides from the waste gas flow. These prior art wet processes are, however, not suitable for removing contaminants from large volumes of waste gases as they are produced in large plants. This is primarily due to the fact that, after the waste gas flow has been wet-treated by passing it through an aqueous system, the temperature of the waste gas flow is considerably reduced and the moisture content in the gas flow increased to such an extent that the gas flow upon subsequent release to the atmosphere does no longer properly diffuse.

For this reason, dry processes are preferred by the industry wherein the gas flow to be purified is brought into contact with a solid, preferably particulate, material which is capable of removing the respective contaminants from the flow.

Various equipment has been designed for removing specific contaminants from a gas flow by contacting the gas with a solid reactant. The main purpose of such equipment is to cause effective contact between the solid and the gas flow. The prior art solid-gas contact apparatus which have been constructed for this purpose are of the fixed bed type, of the fluidized bed type and of the gas-solid contact column type, wherein the solid is distributed or dispersed within the gas. Such gas-solid contact columns are particularly suitable for purifying large volumes of waste gas for the following reasons.

(1) The solid may be continuously supplied to and withdrawn from the gas stream in a relatively simple manner.

(2) The equipment is of relatively simple construction and requires least investment and expenditure and (3) The treatment can be carried out at large space velocities.

However, in the purification of large volumes of gas flows, the gas-solid contact columns have certain important drawbacks which render such system less efficient and economical unless the drawbacks can be overcome. These drawbacks are:

(1) The greater the solid to gas ratio the better are the purifying effect and performance of the system. Therefore, it is desired to have a solid to gas ratio which is as high as possible. However, the higher the solid to gas ratio in the system, the greater is also the burden or load on the dust collectors or separators which are connected to the system behind the contact column in order again to remove the solid particles from the gas flow. For this reason, the solid to gas ratio in the prior art equipment was kept at a relatively low value in order not to have unduly to increase the dust separating and collecting equipment.

(2) The energy requirement for effectively dispersing particulate solids in a gas flow and for separating and collecting thereafter the solids from the flow is relatively large, particularly when large volumes of gas are to be treated.

(3) It is also extremely difficult to disperse particulate solids throughout a gas flow in a uniform manner.

Accordingly, it is a primary object of this invention to provide for a procedure which overcomes the drawbacks referred to and by means of which particulate solids can be easily dispersed in a gas flow at a high solid to gas ratio and in a uniform manner, whereafter the solids again can be readily separated and collected.

Another object of the invention is to provide a procedure of the indicated kind, wherein the separated and collected solids, after regeneration, are recycled to the process whereby the procedure is rendered continuous.

It is also an object of this invention generally to provide for an improved gas-solid contact procedure of the indicated kind.

According to another object of the invention, a specific solid-gas contact method and apparatus are provided wherein a large quantity of particulate solid is effectively dispersed throughout a large volume of a contaminated gas, whereafter the solid, after having effectively removed the contaminants from the gas, is recovered and recycled to the system.

Still a further object of the invention is to provide a method for removing sulfur dioxide from a waste gas flow by effectively dispersing throughout the waste gas an absorbent material which is capable of absorbing $SO_2$, whereafter the absorbent is removed from the waste gas flow and, after regeneration, is recycled for moving a fresh amount of $SO_2$ from the flow.

Generally, it is an object of this invention to improve on solid-gas contact procedure as presently practiced.

Briefly, and in accordance with this invention, before the gas flow to be treated enters the gas-solid contact column, a portion of the gas flow is branched off and admixed with particulate solid whereafter the thus enriched branch flow is fed back into the main stream of the flow. In this manner, the particulate solid is effectively distributed throughout the entire gas flow in a uniform manner. The gas-solid mixture then enters the contact column proper, whereafter the larger particles of the solid, constituting the major portion of the solid material, are separated from the gas in a first separating stage. This may be effected, for example, in a centrifugal-type separator. The particles of finer size are thereafter separated in a second stage, for example, in an electrostatic precipitator, whereafter the purified gas is discharged to the atmosphere. The separated solid, if necessary after regeneration, is then recycled to the process by admixing the solid with the part flow which has been branched off from the main stream.

The solid to gas ratio is kept at a very high value which means that only a small portion of the solid particles actually participate in the purification of the gas. This means, in turn, that only a small portion of the solid has to be regenerated. Therefore, a major portion of the material separated in the first separating stage can be directly recycled to the process while a minor portion is conveyed to the regenerating equipment. The fine particle material which is separated in the second stage, however, is in its entirety conveyed to the regenerating equipment where it is regenerated and relatively large-sized particles are again formed which are then conveyed back to the process.

The various features of novelty which characterize the invention are pointed out with particularity in the claims annexed to and forming a part of this specification. For a better understanding of the invention, its operating advantages and specific objects attained by its use, reference should be had to the accompanying drawings in which there is illustrated and described a preferred embodiment of the invention.

In the drawings:

FIG. 1 is a diagrammatical showing of one embodiment of an apparatus for continuously purifying a waste gas flow by means of particulate solids and for regenerating the solids after contact with the gas flow and recycling of the regenerated solid to the gas flow.

The embodiment shown in the single figure is particularly suitable for the removal of specific contaminants from a gas flow by absorption.

Referring now to the drawing, the gas flow to be treated is indicated by the arrow 1' and enters the inventive apparatus through main conduit 1. A part of the gas flow 1' is branched off through line 2 and flows through conduit 2' to enter a powder dispersing means 4. A blower 3 is connected between lines 2 and 2' to accelerate the flow of the gas into the dispersing means 4. Particulate solid, e.g. powder, is supplied to the dispersing means 4 from a feeder means 20. An intimate mixture of gas and powder is thus formed in means 4 which is conveyed through conduit 5 back into the main stream 1' of the gas which flows through conduit 1. If the grain size of the powder is too large, suitable comminuting means may be provided at a suitable location in the system to enrich the part flow with powder of suitable grain size. Conduit 5 is of a construction so as to accelerate the flow of the powder-enriched gas and thus may be of the injector or ejector type with a venturi nozzle or the like whereby the gas-solid mixture enters the main stream of the gas at high speed.

The combined gas flow 1" now enters the ascending section 6 of the gas-solid column. By bleeding off a portion of the main gas flow and enriching that portion with the solid particles, whereafter the mixture is reintroduced into the main stream, a uniform dispersion of the solid particles throughout the gas stream is effected. The gas-solid mixture after having passed through the ascending portion 6 flows through the descending section 7 of the column. Section 7 is of larger diameter than section 6. Due to the intimate contact between the powder particles and the gas, effective removal of the respective contaminants from the gas by the solid particles takes place by absorption or adsorption. The gas-solid mixture exits at the bottom of column 7 through line 8 and enters the separator 9 constituting the first separating stage. The separator may be of the centrifugal type and the major portion of the powder particles are separated therein from the gas stream. This major portion consists of relatively large-sized particles. The gas exits from the top of the separator through conduit 10 and enters an electrostatically operated precipitator or dust collector 11 where residual particles of fine size are removed from the gas stream. The thus purified gas stream is then discharged to the atmosphere through a chimney or the like as indicated at 12.

A portion of the solid separated in separator 9 and the entire amount of solid separated in precipitator 11 are thereafter conveyed to regenerating equipment indicated by reference numeral 15. This is done by means of conduits or conveying means 14 and 13, respectively. Absorbed or adsorbed contaminants are removed in the regenerating equipment and the powder is regenerated and activated. The regenerating treatment is also carried out so as to increase the grain size of the particles to a suitable size.

A relatively large amount of solid particles is added to the branch flow in the dispersing means 4 so as to maintain the solid to gas ratio at a high value. In fact, the amount of solid dispersed within the gas flow is usually several times to several tens of times as large as the equivalent amount of contaminants which are to be removed from the gas. This means that only a portion of the solid particles reacts with the contaminants while the major portion of the particles passes through the system without absorbing or adsorbing any contaminants. Therefore, only that minor portion of separated solid has to be regenerated which, in fact, has absorbed or adsorbed contaminants.

The reactivated, regenerated solid is conveyed from the regenerating equipment 15 through line 16 into a mixer 18. As previously mentioned, the regenerated solid material is again of suitable particle size, to wit, the fine grained fraction of the material fed to the regenerating equipment is enlarged as to its size by the regenerating treatment. The main portion of the material separated in the separator 9 is also fed to the mixer 18 through line 17 and it will be noted that this portion of the solid material reaches the mixer without any regeneration step being necessary. The material entering mixer 18 is mixed and then conveyed through line 19 to the feeding means 20 previously described. The operation may be effected continuously to render it more economical and to facilitate the gas purification treatment.

The dashed lines in the figure which apply to the feeding of the solid material indicate conventional conveyors or the like transporting means for the transfer of powder from one station to another.

The feeding means 20, the dispersing means 4 and the mixer 18 may all be of conventional construction and may be chosen in dependence on the desired properties and the characteristics and particle size of the respective solids.

The electrostatic precipitating means or dust collector 11 may be replaced by a filter-type separator, if desired.

The reactivated solid particles conveyed through line 16 and the major portion of the solid which is discharged from the centrifugal separator 9 through line 17 may be supplied to the branch flow flowing through line 2' into the dispersing means 4 through separate conduits, in which event the mixer 18 would be dispensed with and the separated solid quantities would then be directly fed into the dispersing means 4.

It should also be appreciated that the invention is not limited to the particular type of column shown in the drawing, but horizontally arranged columns or ducts can be used as well in the same manner.

The operation and principal features of the present invention are further explained as follows:

(1) By dispersing a large amount of solid particles through the gas flow, a desired high ratio of solid to gas may be readily obtained. As previously set forth, the amount of solid may be a multiple of the amount of contaminants to be removed and, in fact, may reach tenfold multiples. Due to the particular dispersing method, as used in accordance with this invention, uniform dispersion of such large amounts of solid is still obtained.

As set forth hereinabove, a high solid to gas ratio results in an increased load on the separating means. However, in accordance with the procedure of this invention, the load on the separating means is not increased. The gas-solid mixture, after having passed through the column 6, 7, first enters the centrifugal type separator 9. The greater portion of the solid particles is separated in this separator and the major portion of this separated material is directly fed to the mixer 18 through conduit 17 for re-cycling the gas flow. In other words, the greater portion of the solid particles is circulated between the dispersing means and the centrifugal type separator. This centrifugal type separator serves the function of a sieve to classify and collect solid particles which are coarser than a predetermined constant particle size. Therefore, the circulating or recycled solid particles are classified within the centrifugal type separator to have a size which is within the range of particular predetermined values. The collecting efficiency of the centrifugal type separator is significantly increased in this manner as compared to separating systems in which no circulation takes place. Consequently, an increase in the solid to gas ratio does not increase the dust content rate at the outlet of the second stage dust collector, while the load on the dispersing means is correspondingly lighter. Since that portion of the solid which is of finer particle size is separated and collected in the electrostatic dust collector or precipitator 11, and is thereafter subjected to a regeneration treatment during which treatment the particle size is increased to a desired value, most of the particles thus regenerated and enlarged will be separated in the centrifugal separator 9. This means that no significant amount of fine particles accumulates in the recycled solid. Therefore, even if the solid to gas ratio is increased, the load on the dust collectors or separators is not increased and the proportion of solid passing through the gas outlets of the separators is maintained at substantially a constant value. Further, since a portion of the solids collected in the separators is, upon reactivation in the regenerating equipment, again supplied to the gas flow through the dispersing means the absorption or adsorption activity of the solid is maintained at a constant value.

These factors have been confirmed by the following experiment:

Sulfur oxides, to wit, sulfur dioxide and sulfur trioxide contained in a heavy oil combustion boiler flue gas containing about 0.1 percent by volume of sulfur oxide, were removed by treating the flue gas flow with active manganese oxide powder. The particle size of the powder did not exceed 100$\mu$. The apparatus of FIG. 1 was used for the experiment. The capacity of the apparatus was 3000 Nm.$^3$/hr. and 90 percent of the sulfur oxides were removed with the mole ratio of the sulfur oxides to the active manganese oxide being 20. The centrifugal separator 9 was a multicyclone and the collection efficiency in the multicyclone for the active manganese powder was 83 percent in the first circulation step, 85 percent in the second circulation step, and 89 percent in the third circulation step. This clearly indicates the improved sieving effect attained by the invention.

(2) Cost reduction for supplying the solid or powder and uniform dispersion of the solid in the gas stream are due to the dispersion of the solid in a part flow of the gas which is branched off from the main gas stream. Then, after this branch flow has been sufficiently accelerated, it is again combined with the main gas stream. The volume of gas to be branched off is dependent on the amount of solid to be admixed with the gas flow. By maintaining the amount of solid in the branched-off gas flow at a value less than one kilogram per one kilogram of gas flow, the dispersion and transfer of the solid in the gas stream can be readily and uniformly conducted. The velocity of the branched-off gas flow, after it has exited from the dispersing means 4, to wit, when the branched-off gas flows through the ejector of venturi means 5 should preferably be five meters per second higher than the end velocity of the solid to be dispersed.

The fact that the dispersion effect obtained in accordance with this invention is much superior to that obtained in prior art equipment is confirmed by the high absorption rate for the contaminant as obtained in accordance with this invention. In this connection, reference is had to the above-mentioned example. In the example, the solid to gas ratio was 20, calculated as mole ratio. The amount of the solid is, however, about 60 grams per one kilogram of gas, if the mole ratio is converted into weight ratio. This means that about $\frac{1}{16}$ of the total gas amount is branched off from the main gas stream and one kilogram of solid may be added to one kilogram of the gas in the divided flow. It follows from the above that the cost for the energy and equipment necessary for dispersing the solid in the gas in the above example may be about $\frac{1}{16}$ of that required in conventional equipment wherein the solid is directly added to the entire volume of the gas. It will be appreciated, of course, that the amount of gas to be branched off from the main stream will depend on the particular contaminants and the nature of the gas flow to be treated. Generally speaking, however, it may be about one-tenth of the total volume of the gas to be treated.

It is generally very difficult uniformly to disperse solid particles in a gas stream. For example, in a large scale steam power plant in which the gas volume per power generator is 700,000 to 1,000,000 $Nm.^3$ per hour, the dispersion of a solid for removing contaminants from the waste gases is a major problem. It will be appreciated that this problem is significantly facilitated by dispersing the solid particles in a fraction of the flow only, for example in one-tenth of the entire gas volume and thereafter combining the branched gas flow with the main stream of the gas, as taught in accordance with this invention.

In the embodiment shown in the figure of the drawing, the column is of the vertical type and the diameter of the descending section is larger than that of the ascending section. This construction has been chosen for the purpose of reducing the gas velocity and this is an effective means for increasing the retention time of the gas within the column while at the same time increasing the relative velocity of the gas and the solid. This, of course, in turn, results in an increased purification effect since the contact between the solid and the gas will be prolonged and more intimate.

However, it will be appreciated that the particular configuration of the flow passage through which the gas stream admixed with the solid is passed is not of critical importance for the purposes of this invention.

It will also be realized that the greater portion of the solid, to wit, a portion primarily consisting of coarser particles is separated and recovered in the first separating step by the centrifugal dust collector or separator, the remaining solid portion primarily consisting of fine particles which are recovered in the second step in the electrostatic precipitator. As previously mentioned, the electrostatic precipitator may be replaced by a filter-type dust collector.

While the invention has hereinabove primarily been explained in connection with the purification of a contaminated waste gas flow, for example, a procedure in which a solid powder is dispersed in a waste gas stream for the removal of specific components such as sulfur oxides, the invention, as previously set forth, is applicable to other procedures wherein a gas and powder are to be mixed for other purposes as, for example, for carrying out vapor phase reactions with a catalyst in powder form or for conducting a heat exchange procedure between solid particles and a gas stream.

Since the dispersion of the solids in the gas is effected in a dispersing means through which only a minor portion of the total amount of gas is passed, the size of the dispersing means may, of course, be considerably reduced as compared to prior art constructions. The pressure loss of the treated gas can also be greatly reduced in this manner as compared to procedures wherein the solid particles are directly dispersed in the main body of the gas flow.

While a specific embodiment of the invention has been shown and described in detail to illustrate the application of the inventive principles, it will be understood that the invention may be embodied otherwise without departing from such principles.

What is claimed is:

1. A cyclic method for establishing intimate contact between a particulate solid absorbent material and a contaminated gas flow, which comprises
    (a) dividing the gas flow into a first portion and a second portion with the first portion forming the major amount of the gas flow;
    (b) admixing the particulate solid absorbent material with said second portion of said gas flow in an amount which is a multiple of the amount of the contaminant within the total said gas flow, said solid material comprising relatively coarse particles and relatively fine particles as it is admixed in said second portion;
    (c) accelerating the flow of said solid material and second portion of said gas flow relative to the first portion of said gas flow;
    (d) combining thereafter said first portion of the gas flow with the accelerated second portion of the gas flow, whereby a combined gas flow with solid material of relatively coarse and relatively fine particles dispersed therein is obtained;
    (e) then passing said combined gas flow of (c) through a contact zone and dividing the contact zone into an upstream section and a downstream section and arranging the downstream section to afford a reduced velocity of said combined gas flow;
    (f) removing said combined gas flow from said contact zone and thereafter separating from said combined gas flow in a first separating stage said relatively coarse particles, and depositing the separated said relatively coarse particles in a collection space;
    (g) removing said combined gas flow from the first separating stage and then separating from said combined gas flow in a second separating stage said relatively fine particles and depositing the separated said relatively fine particles in another collection space separate from the collection space for said relatively coarse particles;
    (h) regenerating all of said separated relatively fine particles and a portion of said separated relatively coarse particles so as to obtain particles of said relatively coarse size; and
    (i) recycling said solid material comprised of said relatively coarse particles and said relatively fine particles to said second gas flow.

2. A method, as claimed in claim 1, wherein the volume of said second portion of the gas flow is about one-tenth of the volume of the combined gas flow, said contaminated gas flow being a waste gas containing sulfur oxides and said solid being manganese oxide powder.

3. A method as claimed in claim 1, wherein the volume of said second portion of gas flow is about one-tenth of the volume of the combined gas flow, accelerating said second portion of the gas flow before it is combined with said first portion, the acceleration being carried out such that the second portion is imparted with a velocity which is about 5 meters per second greater than the terminal velocity of the combined flow.

4. A method, as claimed in claim 1, wherein the volume of said second portion of the gas flow is more than $\frac{1}{20}$ of the volume of the combined gas flow.

5. A method, as claimed in claim 1, wherein the amount of said solid being dispersed in said gas flow is more than tenfold in mole ratio to the theoretical equivalent of the amount of contaminant contained in the gas flow.

6. A method, as claimed in claim 1, wherein after the regeneration step, comprising the steps of conveying the regenerated solids to a mixing space, introducing the remainder of the relatively coarse particles not regenerated into the mixing space, and mixing the regenerated and not regenerated solids in the mixing space.

7. A method as claimed in claim 6, comprising the step of conveying the mixed solids to a feeding space and reintroducing the mixed solids from the feeding space into the admixing step.

References Cited

UNITED STATES PATENTS

| | | | |
|---|---|---|---|
| 727,030 | 5/1903 | Tilghman | 55—466 X |
| 1,298,409 | 3/1919 | Schmidt | 55—126 X |
| 1,825,707 | 10/1931 | Wagner | 55—79 |
| 1,895,601 | 1/1933 | Beuthner | 55—474 X |
| 2,231,424 | 2/1941 | Huppke | 55—77 X |
| 3,150,923 | 9/1964 | Bienstock et al. | |

FOREIGN PATENTS 559,532   2/1944   Great Britain.

REUBEN FRIEDMAN, Primary Examiner

J. ADEE, Assistant Examiner

U.S. Cl. X.R.

55—79